United States Patent
Chen

(10) Patent No.: US 11,170,193 B2
(45) Date of Patent: Nov. 9, 2021

(54) OBJECT IDENTIFYING METHOD AND RELATED CIRCUITS

(71) Applicant: NOVATEK Microelectronics Corp., Hsinchu (TW)

(72) Inventor: Chi-Ting Chen, Hsinchu (TW)

(73) Assignee: NOVATEK Microelectronics Corp., Hsinchu (TW)

( * ) Notice: Subject to any disclaimer, the term of this patent is extended or adjusted under 35 U.S.C. 154(b) by 12 days.

(21) Appl. No.: 16/840,445

(22) Filed: Apr. 5, 2020

(65) Prior Publication Data

US 2021/0064838 A1 Mar. 4, 2021

Related U.S. Application Data

(60) Provisional application No. 62/893,775, filed on Aug. 29, 2019.

(51) Int. Cl.
*G06F 3/041* (2006.01)
*G06K 9/00* (2006.01)
*G09G 3/3225* (2016.01)
*G09G 3/36* (2006.01)

(52) U.S. Cl.
CPC ......... *G06K 9/0004* (2013.01); *G06F 3/0412* (2013.01); *G09G 3/3225* (2013.01); *G09G 3/3607* (2013.01)

(58) Field of Classification Search
CPC .. G06K 9/0004; G09G 3/3225; G09G 3/3607; G06F 3/042; G06F 3/0421
See application file for complete search history.

(56) References Cited

U.S. PATENT DOCUMENTS

| 6,448,544 | B1* | 9/2002 | Stanton | G01T 1/2928 250/208.1 |
| 7,861,934 | B1* | 1/2011 | Williams | G06Q 30/02 235/462.09 |
| 10,165,211 | B1* | 12/2018 | Borthakur | H04N 5/361 |
| 2004/0208348 | A1* | 10/2004 | Baharav | G06K 9/00026 382/124 |
| 2007/0182723 | A1* | 8/2007 | Imai | G06F 3/0412 345/175 |
| 2010/0201275 | A1* | 8/2010 | Cok | G06F 3/042 315/158 |
| 2010/0225617 | A1* | 9/2010 | Yoshimoto | G06F 3/042 345/175 |

(Continued)

FOREIGN PATENT DOCUMENTS

TW 201706809 A 2/2017

*Primary Examiner* — Antonio Xavier
(74) *Attorney, Agent, or Firm* — CKC & Partners Co., LLC

(57) ABSTRACT

An object identifying method, suitable for an object identifying circuit configured to be disposed under a display panel, includes the following operations: displaying a black pattern by the display panel; generating a plurality of first sensing signals of a plurality of first sensor pixels of the display panel arranged in the black pattern; generating a plurality of second sensing signals of a plurality of second sensor pixels of the display panel arranged in a contact area with which the display panel contacting an object to be identified; adjusting voltage levels of the plurality of second sensing signals according to the plurality of first sensing signals; and generating an image corresponding to the object to be identified from the adjusted plurality of second sensing signals.

15 Claims, 10 Drawing Sheets

(56) References Cited

U.S. PATENT DOCUMENTS

| | | | |
|---|---|---|---|
| 2010/0237149 A1* | 9/2010 | Olmstead | G06K 7/10722 |
| | | | 235/470 |
| 2010/0295821 A1* | 11/2010 | Chang | G06F 3/0421 |
| | | | 345/175 |
| 2011/0291993 A1* | 12/2011 | Miyazaki | G06F 3/042 |
| | | | 345/175 |
| 2012/0223882 A1* | 9/2012 | Galor | G06F 3/011 |
| | | | 345/157 |
| 2013/0278147 A1* | 10/2013 | Vetsuypens | G09G 5/10 |
| | | | 315/151 |
| 2016/0173794 A1* | 6/2016 | Beck | H01L 27/14601 |
| | | | 348/244 |
| 2017/0303830 A1* | 10/2017 | Klein | A61B 5/6815 |
| 2018/0005005 A1* | 1/2018 | He | G06K 9/0004 |
| 2018/0101259 A1* | 4/2018 | No | G06F 21/32 |
| 2019/0362121 A1* | 11/2019 | Wang | G06K 9/0004 |
| 2020/0285829 A1* | 9/2020 | Chang | G06K 9/00067 |
| 2020/0321377 A1* | 10/2020 | Hargreaves | H01L 27/14609 |

\* cited by examiner

OBJECT IDENTIFYING METHOD AND RELATED CIRCUITS

CROSS-REFERENCE TO RELATED APPLICATION

This application claims priority to U.S. Provisional Application Ser. No. 62/893,775, filed Aug. 29, 2019, which is herein incorporated by reference in its entirety.

BACKGROUND

Field of Invention

The present disclosure generally relates to an object identifying method. More particularly, the present disclosure relates to an optical object identifying method.

Description of Related Art

In order to make the product more beautiful, mobile devices are often configured to place an optical fingerprint sensor module under a display panel, or integrate the optical fingerprint sensor module into the display panel to achieve a full screen design. The optical fingerprint sensor module generates a fingerprint image by measuring leakage currents of photodiodes that are exposed to light reflected by a fingertip, however, photodiodes would also slightly generate leakage currents when photodiodes that are not exposed to light, thereby having the so-called dark currents. Dark current may greatly occupy the dynamic range of the sensing result, thereby reducing the accuracy of the fingerprint image.

SUMMARY

The disclosure provides an object identifying method, suitable for an object identifying circuit configured to be disposed under a display panel, includes the following operations: displaying a black pattern by the display panel; generating a plurality of first sensing signals of a plurality of first sensor pixels of the display panel arranged in the black pattern; generating a plurality of second sensing signals of a plurality of second sensor pixels of the display panel arranged in a contact area with which the display panel contacting an object to be identified; adjusting voltage levels of the plurality of second sensing signals according to the plurality of first sensing signals; and generating an image corresponding to the object to be identified from the adjusted plurality of second sensing signals.

The disclosure provides another object identifying method, suitable for an object identifying circuit configured to be disposed under a display panel, includes the following operations: generating a plurality of first sensing signals of a plurality of first sensor pixels of the display panel, wherein the plurality of first sensor pixels are covered by a display border of the electronic apparatus; generating a plurality of second sensing signals of a plurality of second sensor pixels of the display panel arranged in a contact area with which the display panel contacting an object to be identified; adjusting voltage levels of the plurality of second sensing signals according to the plurality of first sensing signals; and generating an image corresponding to the object to be identified from the adjusted plurality of second sensing signals.

The disclosure provides an object identifying circuit configured to be disposed under a display panel. The object identifying circuit is adapted to: control the display panel to display a black pattern; generate a plurality of first sensing signals of a plurality of first sensor pixels of the display panel arranged in the black pattern; generate a plurality of second sensing signals of a plurality of second sensor pixels of the display panel arranged in a contact area with which the display panel contacting an object to be identified; adjust voltage levels of the plurality of second sensing signals according to the plurality of first sensing signals; and generate an image corresponding to the object to be identified from the adjusted plurality of second sensing signals.

It is to be understood that both the foregoing general description and the following detailed description are by examples, and are intended to provide further explanation of the disclosure as claimed.

DETAILED DESCRIPTION

Figure 1:
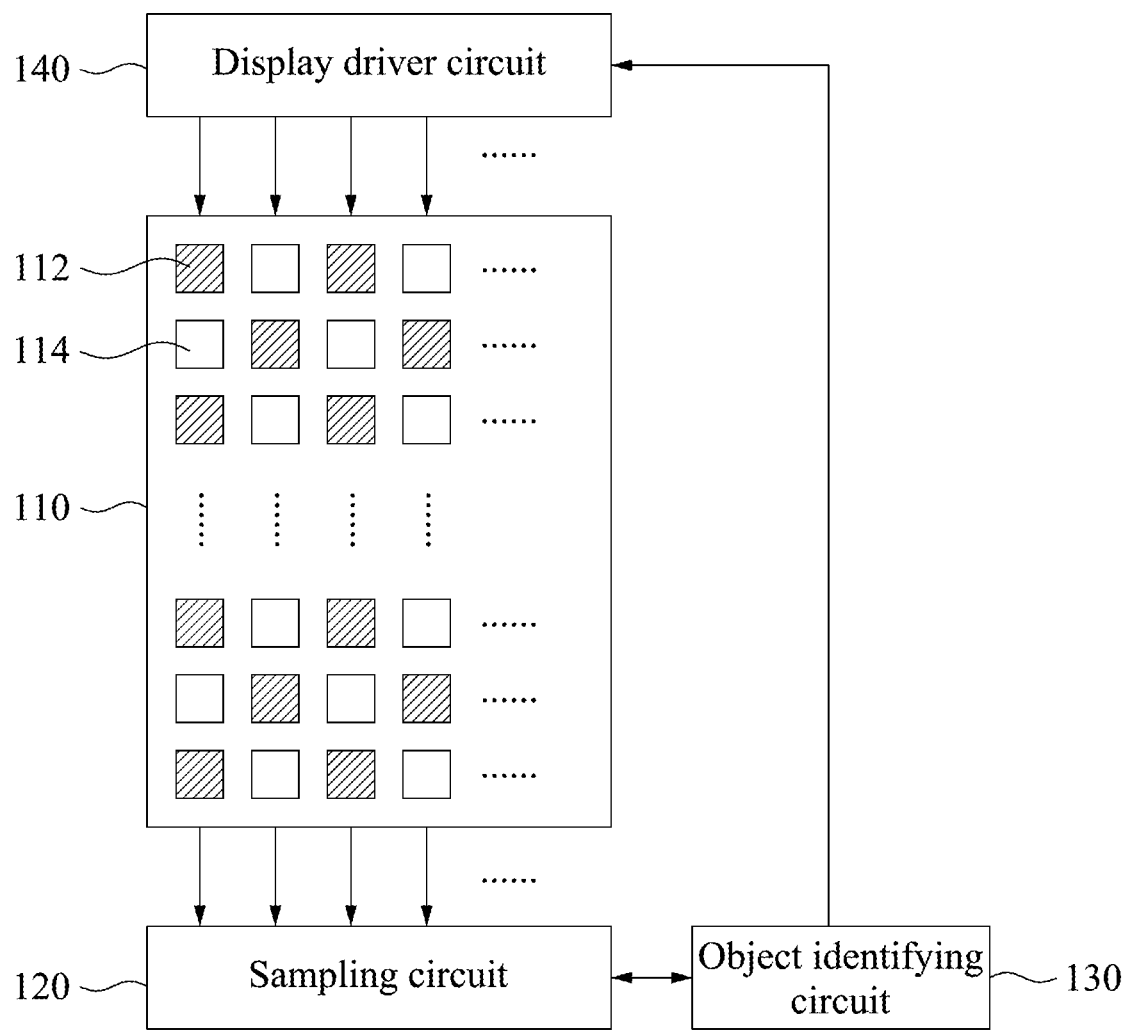
FIG. 1 is a simplified block functional block diagram of an object identifying system according to one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a simplified block functional block diagram of an object identifying system 100 according to one embodiment of the present disclosure. The object identifying system 100 comprises a display panel 110, a sampling circuit 120, an object identifying circuit 130, and a display driver circuit 140. In some embodiments, the object identifying circuit 130 is configured to be disposed under the display panel 110. The object identifying system 100 is configured to sense an image of an object contacting with a surface of the display panel 110. For example, the object identifying system 100 may be configured to realize optical fingerprint sensing. For the sake of brevity, other functional blocks of the object identifying system 100 are not shown in FIG. 1.

The display panel 110 comprises a plurality of sensor pixels 112 and a plurality of display pixels 114, wherein sensor pixels 112 and the display pixels 114 may be disposed on the same substrate or different substrates. In practice, each sensor pixel 112 may comprises a plurality of transistors, a storage capacitor, and a photodiode. Each display pixel 114 may be realized by a liquid crystal pixel circuit or an organic light-emitting diode (OLED) pixel circuit. Each sensor pixel 112 is configured to sense surrounding light, and generates a sensing current according to intensity of the sensed surrounding light. The sampling circuit 120 is configured to receive the sensing currents so as to generate corresponding sensing signals. In practice, the sampling circuit 120 may be realized by analog front end (AFE) circuit comprising a correlated double sampling (CDS) circuits, a charge amplifier circuits, and a single to differential amplifiers. The sensor pixels 112 and the display pixels 114 may be alternately arranged (e.g., as a chess board pattern), but this disclosure is not limited thereto.

The display driver circuit 140 is configured to provide data signals specifying gray levels for the display pixels 114. The display driver circuit 140 may also provide clock signals to shift registers (not shown) of the display panel 110, so as to generate gate signals for driving transistors of the sensor pixels 112 and the display pixels 114. The object identifying circuit 130 is configured to process output of the sampling circuit 120 to generate an image (e.g., fingerprint) corresponding to the object contacting with the display panel 110.

The object identifying circuit 130 can be a microprocessor, a central processing unit (CPU), an application-specific integrated circuit (ASIC), a digital signal processor (DSP), or combinations of multiple such devices. In some embodiments, the object identifying circuit 130 and the display driver circuit 140 may be integrated as one single chip, for example, the object identifying circuit 130 and the display driver circuit 140 may be realized by one touch and display driver integration (TDDI).

Figure 2:
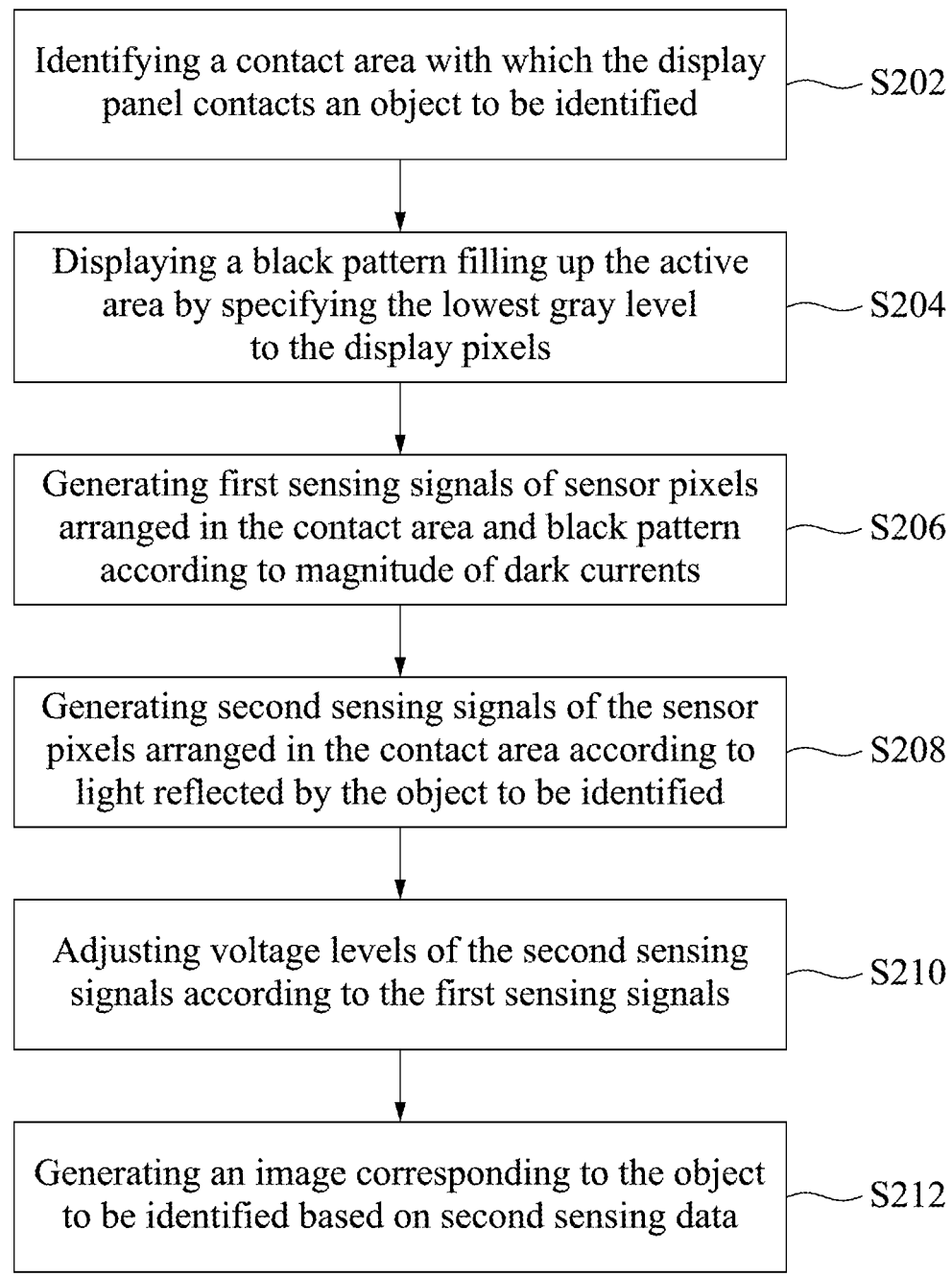
FIG. 2 is a flow chart of an object identifying method according to one embodiment of the present disclosure.
Figure 3:
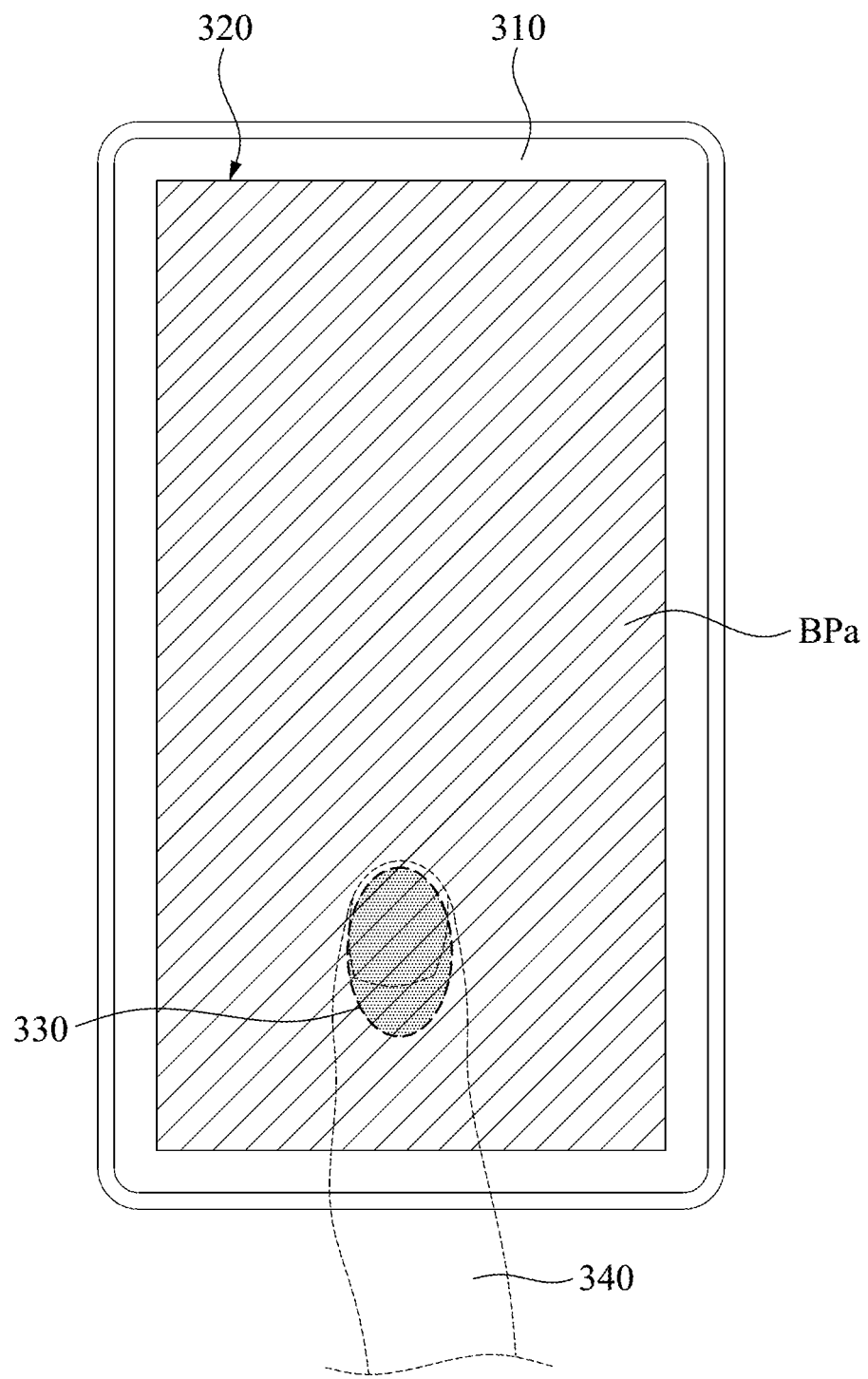
FIG. 3 is a simplified top view schematic diagram of an electronic apparatus according to one embodiment of the present disclosure.

FIG. 2 is a flow chart of an object identifying method 200 according to one embodiment of the present disclosure. FIG. 3 is a simplified top view schematic diagram of an electronic apparatus 300 according to one embodiment of the present disclosure. In order to facilitate understanding, the display panel 110 is described as an OLED display panel in the following paragraphs, but this disclosure is not limited thereto. The electronic apparatus 300 comprises the object identifying system 100 of FIG. 1, a display border 310, and an active area 320. The active area 320 refers to an area capable of providing image by the display panel 110 to a user, and the sensor pixels 112 and display pixels 114 of FIG. 1 are arranged in the active area 320 to from a pixel array having a plurality of rows and a plurality of columns.

Reference is made to FIGS. 2 and 3, in operation S202, the object identifying circuit 130 identifies a location of a contact area 330 with which the display panel 110 contacts an object to be identified 340 (e.g., a fingertip of a user) according to output of the sampling circuit 120. In this embodiment, the display panel 110 may remain in a sleep mode in operation S202 and thus the display pixels 114 do not need to be lighted.

In operation S204, the display panel 110 displays a black pattern BPa for sensing dark currents of the sensor pixels 112, wherein the dark current refers to a leakage current flowing through the photodiode of the sensor pixel 112 when no (or almost no) photos are received by the photodiode. The dark current may be used to compensate the sensing signals processed by the sampling circuit 120, which will be further described in the following paragraphs. The black pattern BPa is configured to fill up the whole active area 320. To display the black pattern BPa, the object identifying circuit 130 may instruct the display driver circuit 140 to provide data signals specifying the lowest gray level (e.g., gray level 0) to the display pixels 114.

Figure 4A:
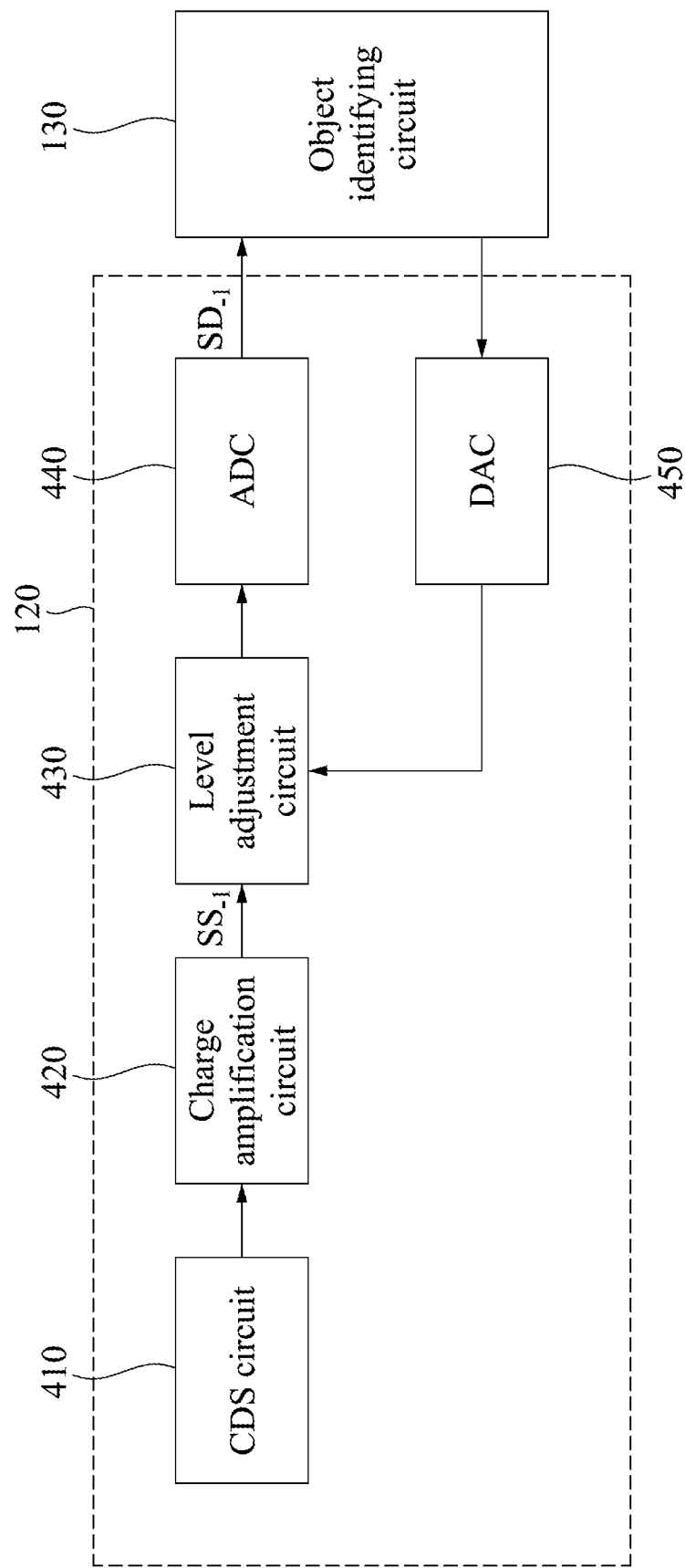
FIG. 4A is a simplified functional block diagram of a sampling circuit according to one embodiment of the present disclosure.
Figure 4B:
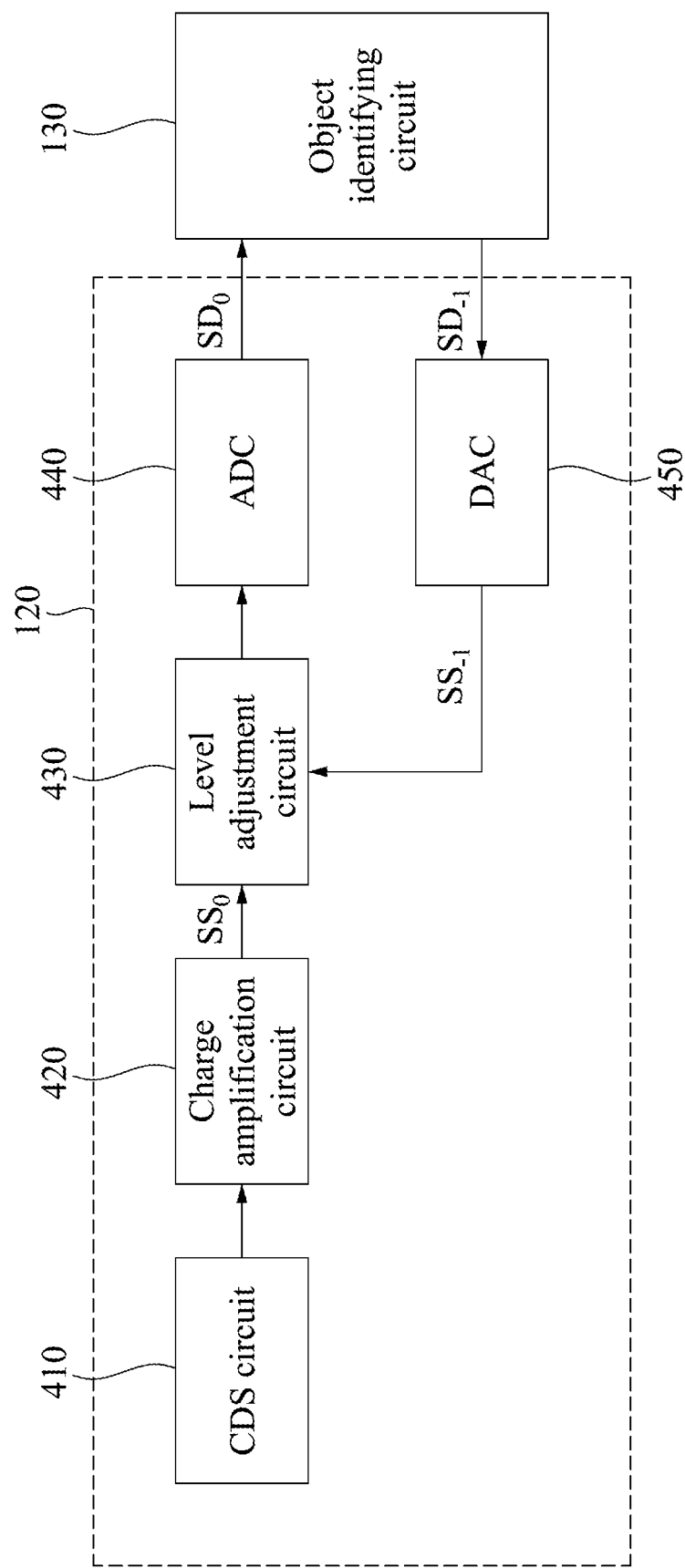
FIG. 4B is a simplified functional block diagram of a sampling circuit according to another embodiment of the present disclosure.

FIG. 4A is a simplified functional block diagram of the sampling circuit 120 according to one embodiment of the present disclosure. FIG. 4B is a simplified functional block diagram of the sampling circuit 120 according to another embodiment of the present disclosure. The sampling circuit 120 comprises a CDS circuit 410, a charge amplification circuit 420, a level adjustment circuit 430, an analog-to-digital converter (ADC) 440, and a digital-to-analog converter (DAC) 450. For the sake of brevity, other functional blocks of the sampling circuit 120 are not shown in FIG. 4A. Reference is made to FIGS. 2 and 4A, in operation S206, the CDS circuit 410 may collect sensing currents generated by the sensor pixels 112 arranged in the contact area 330 and also in the black pattern BPa, wherein the sensing currents in this operation is generated according to the magnitude of dark currents. The charge amplification circuit 420 may transfer the collected charges to a plurality of first sensing signals $SS_{-1}$, and the level adjustment circuit 430 then adjusts the voltage level of the first sensing signals $SS_{-1}$ and/or amplifies the first sensing signals $SS_{-1}$ in order to satisfy an input range of the ADC 440. In practice, the level adjustment circuit 430 may comprise a single to differential amplifier (not shown). Then, the ADC 440 may transfer the first sensing signals $SS_{-1}$ to the first sensing data $S_{-1}$, and the object identifying circuit 130 records the first sensing data $S_{-1}$ for the next operation.

Reference is made to FIGS. 2 and 4B, in operation S208, the object identifying circuit 130 instructs the display pixels 114 to provide a gray scale (e.g., gray scale 255) different from the lowest gray scale, so that the display panel 110 stops providing the black pattern BPa. The CDS circuit 410 may collect sensing currents generated by the sensor pixels 112 arranged in the contact area 330, wherein the sensing currents in this operation is generated according to light reflected by the object to be identified 340. The charge amplification circuit 420 may transfer the collected charges to a plurality of second sensing signals $SS_0$.

In operation S210, the object identifying circuit 130 provides the first sensing data $SD_{-1}$ recorded in operation S206 to the DAC 450. The level adjustment circuit 430 then receives the first sensing signals $SS_{-1}$ outputted by the DAC 450 and the second sensing signals $SS_0$ from the charge amplification circuit 420. The level adjustment circuit 430 adjusts voltage levels of the second sensing signals $SS_0$ according to the first sensing signals $SS_{-1}$. In specific, the level adjustment circuit 430 may determine reference voltages of the single to differential amplifier thereof according to voltage levels of the first sensing signals $SS_{-1}$. Therefore, the single to differential amplifier of the level adjustment circuit 430 may output adjusted second sensing signals $SS_0$ having voltage levels negatively correlated to voltage levels of the first sensing signals $SS_{-1}$.

In operation S212, the ADC 440 transfers the adjusted second sensing signals $SS_0$ to second sensing data $SD_0$. The object identifying circuit 130 generates an image corresponding to the object to be identified 340 based on the second sensing data $SD_0$.

Accordingly, component of the second sensing signals $SS_0$ corresponding to dark current can be eliminated, where component corresponding to the reflected light can be outputted by the ADC 440 by using the full code range thereof.

Therefore, the object identifying method 200 is helpful to increase dynamic range of optical sensing results (e.g., the second sensing data $SD_0$).

Figure 5:
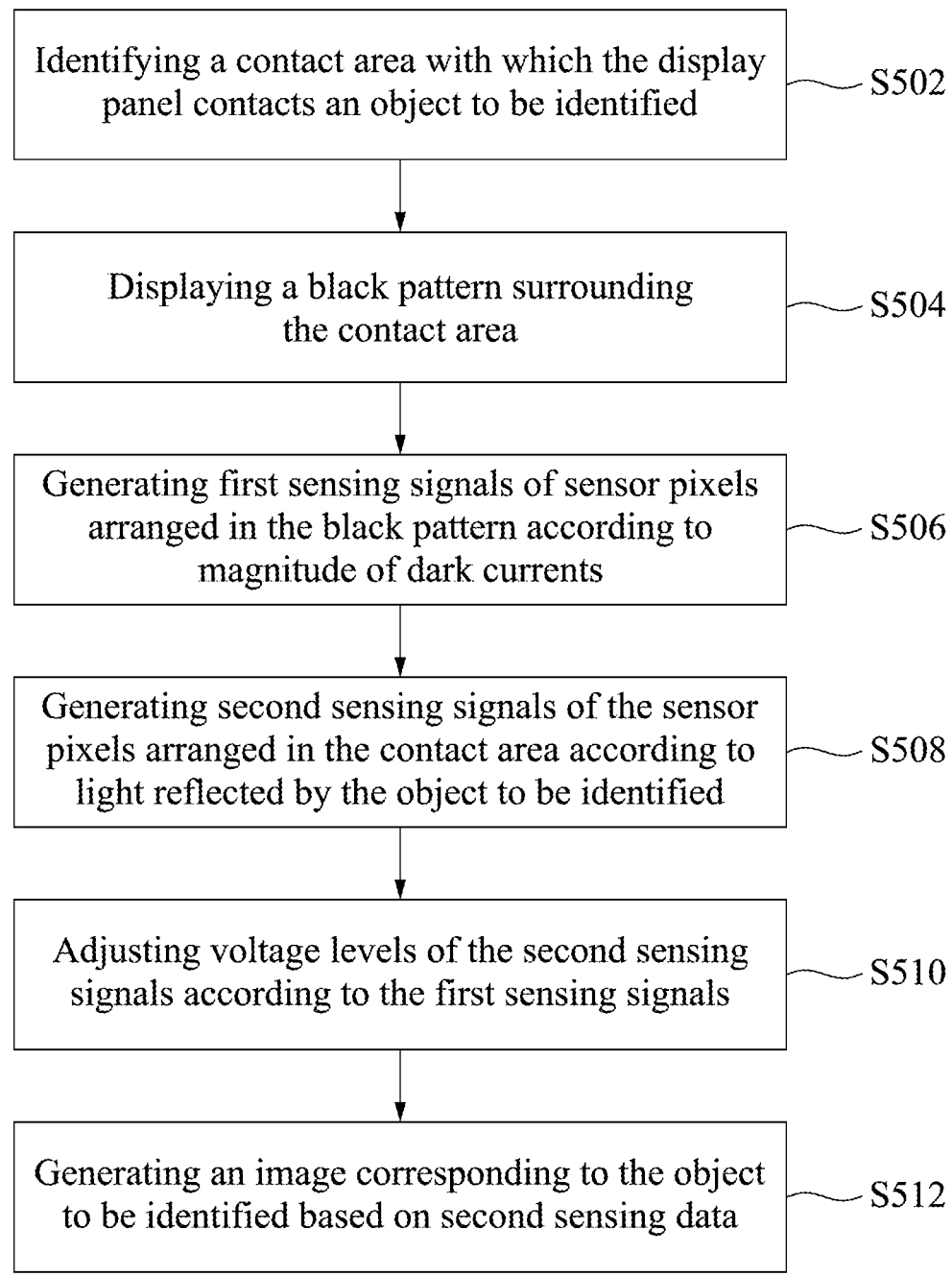
FIG. 5 is a flow chart of an object identifying method according to one embodiment of the present disclosure.
Figure 6A:
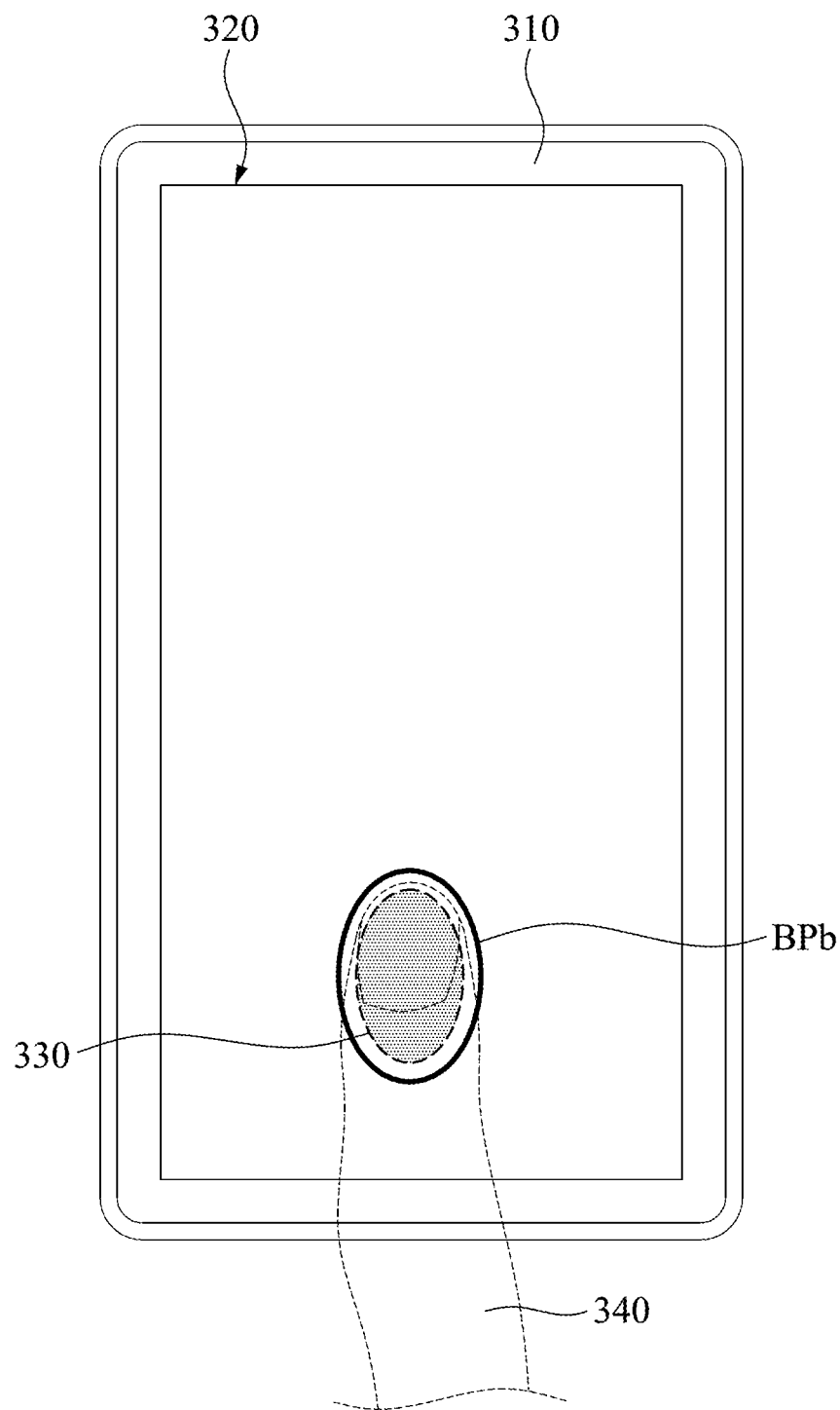
FIG. 6A is a simplified top view schematic diagram of an electronic apparatus according to one embodiment of the present disclosure.

FIG. 5 is a flow chart of an object identifying method 500 according to one embodiment of the present disclosure. FIG. 6A is a simplified top view schematic diagram of an electronic apparatus 600 according to one embodiment of the present disclosure. The electronic apparatus 600 is similar to the electronic apparatus 300 of FIG. 3, and operation S502 is similar to operation S202 of FIG. 2. For the sake of brevity, those descriptions will not be repeated here.

Reference is made to FIGS. 5 and 6A, in operation S504, the object identifying circuit 130 instructs the display pixels 114 to display a black pattern BPb surrounding the contact area 330. In some embodiments, the contact area 330 has an ellipse shape, and the black pattern BPb has a hollow ellipse shape. In other embodiments, the black pattern BPb may connects with an edge of the contact area 330.

Reference is made to FIGS. 5 and 4A, in operation S506, the CDS circuit 410 may collect sensing currents generated by the sensor pixels 112 arranged in the black pattern BPb, wherein the sensing currents in this operation is generated according to the magnitude of dark currents. The other contents of operation S506 are similar to the corresponding contents of operation S206 of FIG. 2.

Operations S508-S512 are similar to operations S208-212 of FIG. 2, respectively, and those descriptions will not be repeated here for the sake of brevity.

Figure 6B:
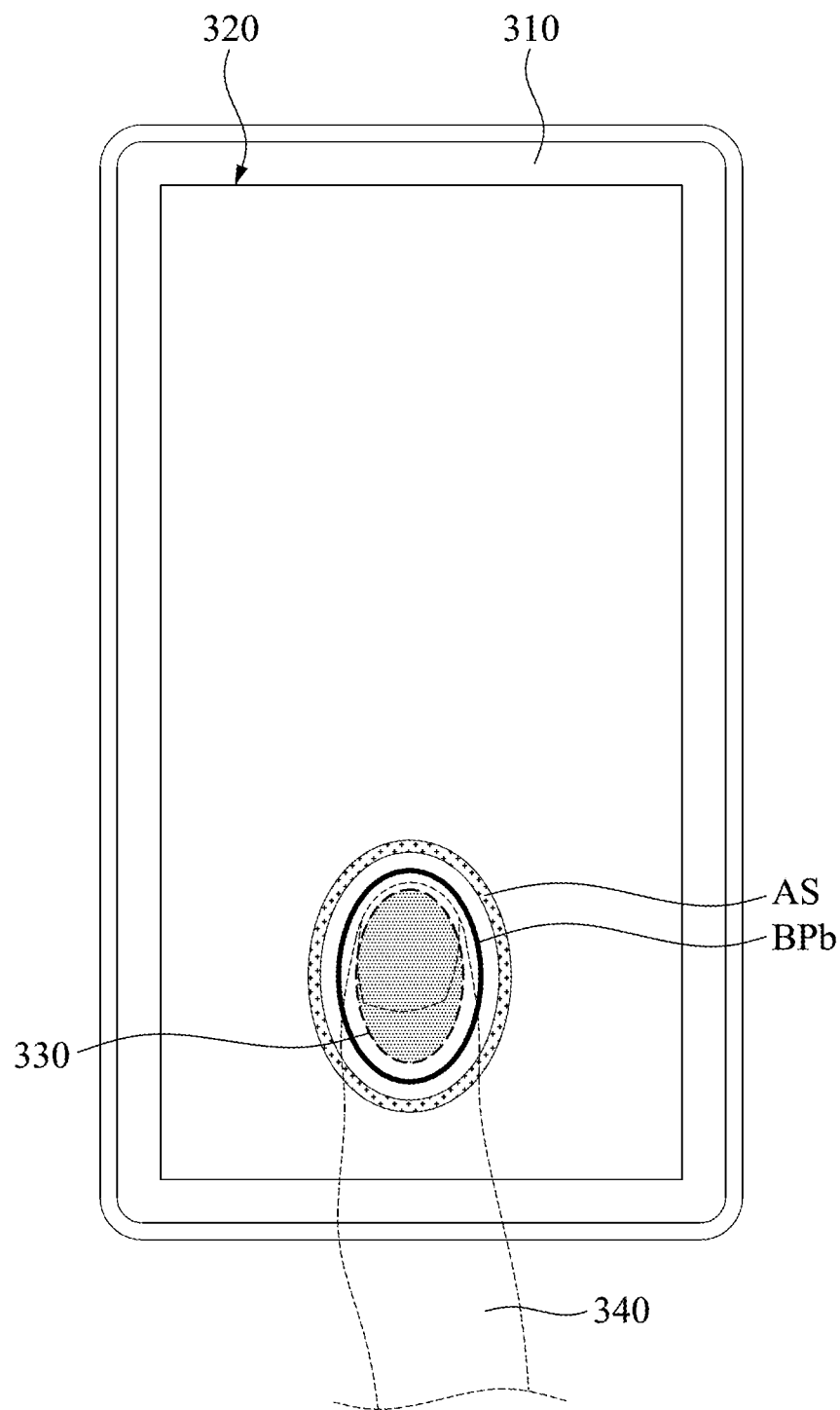
FIG. 6B is a simplified top view schematic diagram of an electronic apparatus according to one embodiment of the present disclosure.

In some embodiments, the object identifying circuit 130 may instruct the display panel 110 to display at least one anti-spoofing pattern SAAS in operation S504. The at least one anti-spoofing pattern AS is configured to detect heart beats of a user. The at least one anti-spoofing pattern AS may be configured to surround the black pattern BPb as shown in FIG. 6B, or the at least one anti-spoofing pattern AS may be configured to be surrounded by the black pattern BPb but surround the contact area 330. The at least one anti-spoofing pattern AS may have colors different from the black pattern BPb, such as green or red.

Accordingly, the object identifying method 500 is helpful to increase dynamic range of optical sensing results. The object identifying method 500 also can inform the user, by the black pattern BPb, to hold his/her finger stably in the contact area 330 when sensing fingerprint.

Figure 7:
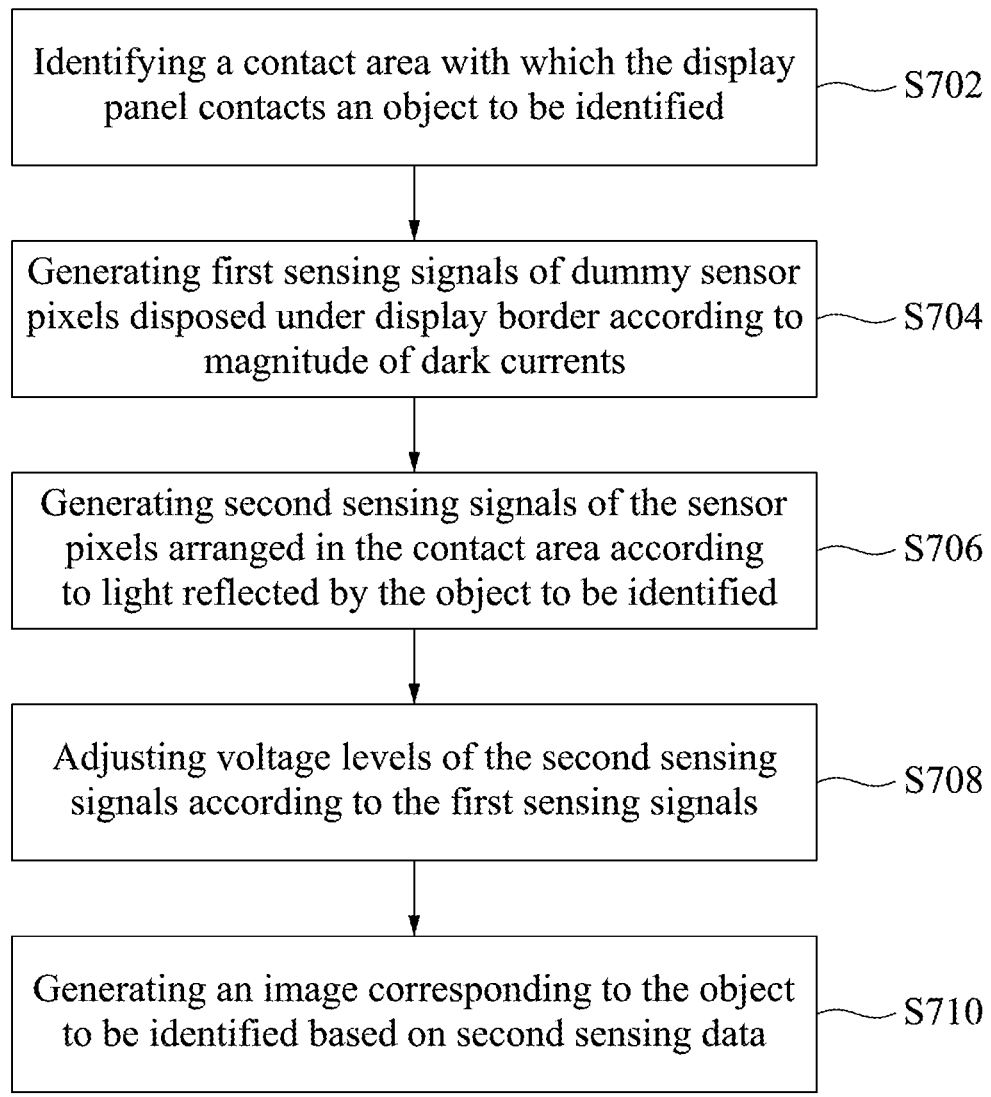
FIG. 7 is a flow chart of an object identifying method according to one embodiment of the present disclosure.
Figure 8:
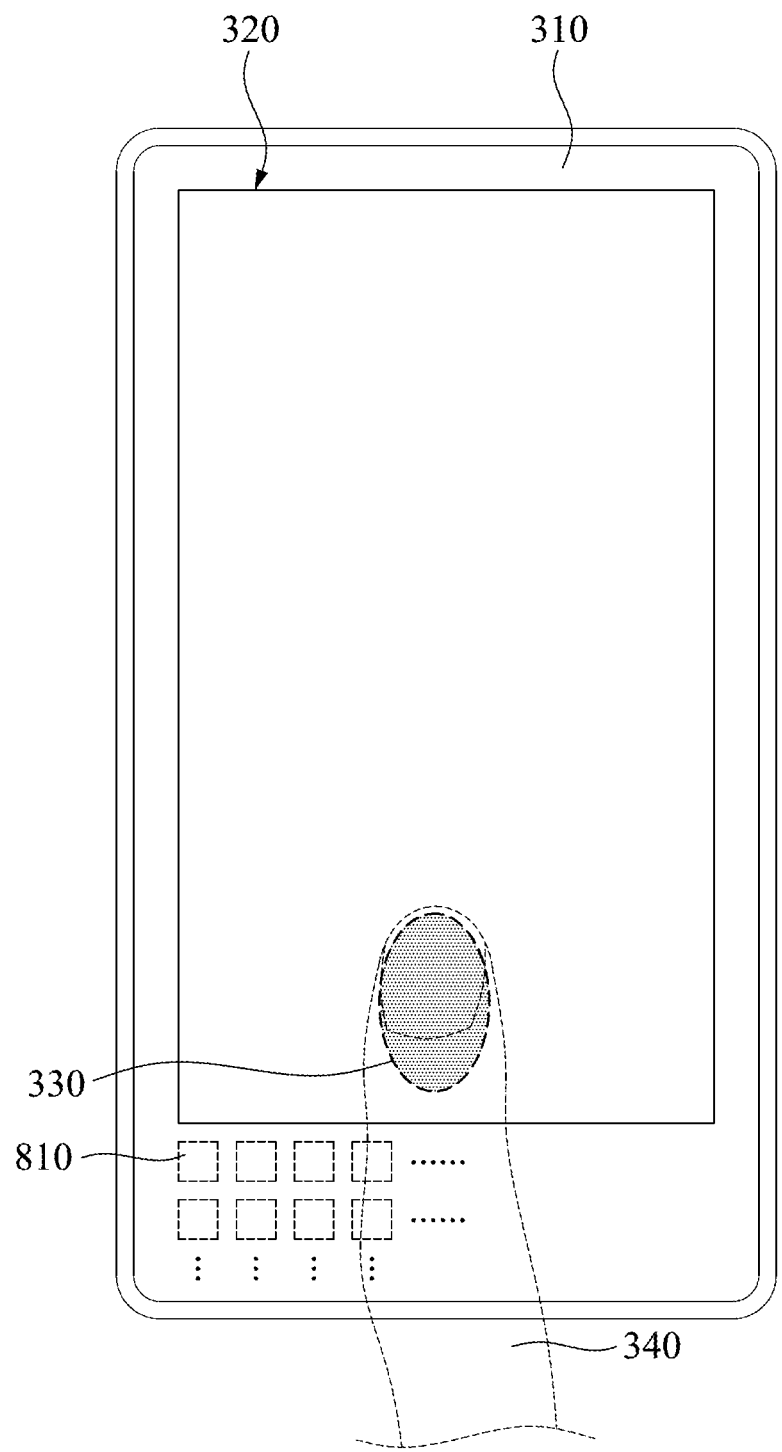
FIG. 8 is a simplified top view schematic diagram of an electronic apparatus according to one embodiment of the present disclosure.

FIG. 7 is a flow chart of an object identifying method 700 according to one embodiment of the present disclosure. FIG. 8 is a simplified top view schematic diagram of an electronic apparatus 800 according to one embodiment of the present disclosure. The electronic apparatus 800 is similar to the electronic apparatus 300 of FIG. 3, and the difference is that the electronic apparatus 800 comprises a plurality of dummy sensor pixels 810. The dummy sensor pixels 810 may be disposed at a substrate (not shown) of the display panel 110 as well as the sensor pixels 112, where the dummy sensor pixels 810 are covered by the display border 310. In other words, the dummy sensor pixels 810 are external to the active area 320, and the dummy sensor pixels 810 may be arranged in at least a portion of a vertical projecting area projected by the display border 310 onto the substrate of the display panel 110.

In some embodiments, the dummy sensor pixels 810 are isolate form light generated by the display pixels 114 (e.g., OLED pixels) and ambient light, for example, by using barrier walls.

Operation S702 is similar to operation S202 of FIG. 2, and those descriptions will not be repeated here for the sake of brevity. Reference is made to FIGS. 7 and 4A, in operation S704, the CDS circuit 410 may collect sensing currents generated by the dummy sensor pixels 810, wherein the sensing currents in this operation is generated according to the magnitude of dark currents. The other contents of operation S704 are similar to the corresponding contents of operation S206 of FIG. 2.

Operations S706-S710 are similar to operations S208-212 of FIG. 2, respectively, and those descriptions will not be repeated here for the sake of brevity.

Accordingly, the object identifying method 700 is helpful to increase dynamic range of optical sensing results. Moreover, since the object identifying method 700 needs not to display a dark pattern, the object identifying method 700 is helpful to increase speed of fingerprint detection.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An object identifying method, suitable for an object identifying circuit configured to be disposed under a display panel, comprising:

displaying a black pattern by the display panel;

generating a plurality of first sensing signals of a plurality of first sensor pixels of the display panel arranged in the black pattern;

generating a plurality of second sensing signals of a plurality of second sensor pixels of the display panel arranged in a contact area where the display panel is contacted by an object to be identified;

adjusting voltage levels of the plurality of second sensing signals according to the plurality of first sensing signals, wherein a level adjustment circuit adjusts voltage levels of the plurality of second sensing signals according to reference voltages that are determined according to voltage levels of the plurality of first sensing signals, and wherein the adjusted plurality of second sensing signals having voltage levels negatively correlated to voltage levels of the first sensing signals; and generating an image corresponding to the object to be identified from the adjusted plurality of second sensing signals.

2. The object identifying method of claim 1, wherein when displaying the black pattern, a plurality of display pixels arranged in an active area of the display panel are configured to provide a lowest gray level to form the black pattern filling up the active area.

3. The object identifying method of claim 2, further comprising:
identifying a location of the contact area,
wherein the plurality of first sensor pixels are arranged in the contact area, and the plurality of first sensor pixels are the same or different from the plurality of second sensor pixels.

4. The object identifying method of claim 1, further comprising:
identifying a location of the contact area,
wherein the black pattern surrounds the contact area.

5. The object identifying method of claim 4, further comprising:
displaying at least one anti-spoofing pattern surrounding the contact area or surrounding both of the black pattern and the contact area, wherein the at least one anti-spoofing pattern and the black pattern have different colors.

6. The object identifying method of claim 1, wherein the plurality of second sensing signals are adjusted, according to the plurality of first sensing signals, before the plurality of second sensing signals are processed by an analog-to-digital converter (ADC).

7. An object identifying method, suitable for an object identifying circuit configured to be disposed under a display panel, comprising:
generating a plurality of first sensing signals of a plurality of first sensor pixels of the display panel, wherein the plurality of first sensor pixels are covered by a display border of the electronic apparatus;
generating a plurality of second sensing signals of a plurality of second sensor pixels of the display panel arranged in a contact area where the display panel is contacted by an object to be identified;
adjusting voltage levels of the plurality of second sensing signals according to the plurality of first sensing signals, wherein a level adjustment circuit adjusts voltage levels of the plurality of second sensing signals according to reference voltages that are determined according to voltage levels of the plurality of first sensing signals, and wherein the adjusted plurality of second sensing signals having voltage levels negatively correlated to voltage levels of the first sensing signals; and
generating an image corresponding to the object to be identified from the adjusted plurality of second sensing signals.

8. The object identifying method of claim 7, wherein the plurality of second sensing signals are adjusted, according to the plurality of first sensing signals, before the plurality of second sensing signals are processed by an ADC.

9. The object identifying method of claim 7, wherein the plurality of first sensor pixels are isolated from light.

10. An object identifying circuit configured to be disposed under a display panel, and being adapted to:
control the display panel to display a black pattern;
generate a plurality of first sensing signals of a plurality of first sensor pixels of the display panel arranged in the black pattern;
generate a plurality of second sensing signals of a plurality of second sensor pixels of the display panel arranged in a contact area where the display panel is contacted by an object to be identified;
adjust voltage levels of the plurality of second sensing signals according to the plurality of first sensing signals, wherein a level adjustment circuit adjusts voltage levels of the plurality of second sensing signals according to reference voltages that are determined according to voltage levels of the plurality of first sensing signals, and wherein the adjusted plurality of second sensing signals having voltage levels negatively correlated to voltage levels of the first sensing signals; and
generate an image corresponding to the object to be identified from the adjusted plurality of second sensing signals.

11. The object identifying circuit of claim 10, wherein when displaying the black pattern, a plurality of display pixels arranged in an active area of the display panel are configured to provide a lowest gray level to form the black pattern filling up the active area.

12. The object identifying circuit of claim 11, wherein the object identifying circuit is further adapted to:
identify a location of the contact area,
wherein the plurality of first sensor pixels are arranged in the contact area, and the plurality of first sensor pixels are the same or different from the plurality of second sensor pixels.

13. The object identifying circuit of claim 10, wherein when the display panel displays the black pattern, the object identifying circuit identifies a location of the contact area, and the black pattern surrounds the contact area.

14. The object identifying circuit of claim 13, wherein when the display panel displays the black pattern, the object identifying circuit controls the display panel to display at least one anti-spoofing pattern surrounding the contact area or surrounding both of the black pattern and the contact area, wherein the at least one anti-spoofing pattern and the black pattern have different colors.

15. The object identifying circuit of claim 10, wherein the plurality of second sensing signals are adjusted, according to the plurality of first sensing signals, before the plurality of second sensing signals are processed by an ADC.

* * * * *